(12) United States Patent
Kikuchi (10) Patent No.: US 10,362,187 B2
(45) Date of Patent: Jul. 23, 2019

(54) IMAGE FORMING APPARATUS

(71) Applicant: KYOCERA Document Solutions Inc., Osaka (JP)

(72) Inventor: Ryota Kikuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/570,950

(22) PCT Filed: Jul. 12, 2016

(86) PCT No.: PCT/JP2016/070539
§ 371 (c)(1),
(2) Date: Oct. 31, 2017

(87) PCT Pub. No.: WO2017/014104
PCT Pub. Date: Jan. 26, 2017

(65) Prior Publication Data
US 2018/0109692 A1    Apr. 19, 2018

(30) Foreign Application Priority Data
Jul. 17, 2015    (JP) .................................. 2015-143282

(51) Int. Cl.
*H04N 1/00* (2006.01)
*H04N 1/047* (2006.01)
(Continued)

(52) U.S. Cl.
CPC ..... *H04N 1/00718* (2013.01); *G03G 15/5016* (2013.01); *G03G 15/5029* (2013.01);
(Continued)

(58) Field of Classification Search
CPC .. H04N 1/00718; H04N 1/00; H04N 1/00708; H04N 1/0074; H04N 1/047;
(Continued)

(56) References Cited

U.S. PATENT DOCUMENTS

| 2005/0019075 A1 | 1/2005 | Adachi et al. ................ 399/395 |
| 2009/0237741 A1 | 9/2009 | Kurahashi ..................... 358/406 |

(Continued)

FOREIGN PATENT DOCUMENTS

JP    07-079321 A    3/1995

OTHER PUBLICATIONS

European Office Action dated Feb. 12, 2019, issued to European Application No. 16827664.0.

*Primary Examiner* — Quang N Vo
(74) *Attorney, Agent, or Firm* — Stein IP, LLC (57) ABSTRACT

This image forming device is provided with: an image reading unit; a control unit which generates distribution data indicating the distribution of an angle of inclination of documents (D) read during a pre-determined time period, performs a test to determine whether there is a significant difference between the distribution data and standard distribution data, and on the basis of the test result determines whether maintenance of the image forming device is required; and a communication unit which, if it has been determined that maintenance is required, transmits a maintenance request notification to a service system.

6 Claims, 7 Drawing Sheets

(51) Int. Cl.
*H04N 1/23* (2006.01)
*H04N 1/32* (2006.01)
*G03G 15/00* (2006.01)

(52) U.S. Cl.
CPC ......... *G03G 15/55* (2013.01); *G03G 15/6567* (2013.01); *H04N 1/00* (2013.01); *H04N 1/0074* (2013.01); *H04N 1/00708* (2013.01); *H04N 1/047* (2013.01); *H04N 1/233* (2013.01); *H04N 1/32673* (2013.01); *H04N 2201/0094* (2013.01)

(58) Field of Classification Search
CPC ............... H04N 1/233; H04N 1/32673; H04N 2201/0094; G03B 27/62; G03G 21/00
USPC ......................................... 358/448, 1.9, 1.15
See application file for complete search history.

(56) References Cited

U.S. PATENT DOCUMENTS

2013/0050767 A1* 2/2013 Stuart ................ H04N 1/00005
358/3.26
2013/0148143 A1* 6/2013 Ooyanagi .......... H04N 1/00015
358/1.12

* cited by examiner

IMAGE FORMING APPARATUS

CROSS-REFERENCE TO RELATED APPLICATIONS

This application is a national stage of International Application No. PCT/JP2016/070539 filed Jul. 12, 2016, which claims the benefit of Japanese Application No. 2015-143282, filed Jul. 17, 2015, in the Japanese Patent Office, the disclosures of which are incorporated herein in their entireties by reference.

TECHNICAL FIELD

The present invention relates to an image forming apparatus incorporating an image reading section that reads a document to generate image data.

BACKGROUND ART

There are conventionally known image forming apparatuses that can perform conveyed-document reading, that is, that can read a document while conveying it. Such image forming apparatuses are provided with a document conveying unit for conveying a document. A document conveyed to a reading position by the document conveying unit is read by an image reading section (conveyed-document reading is achieved).

In conveyed-document reading, when a document is conveyed, it may skew. If a document skews when conveyed, it is read in a skewed state. Thus, the reading yields a skewed document image. To address this problem, there have been proposed techniques for correcting the skew of read document images (see, for example, predetermined 1 identified below).

LIST OF CITATIONS

Patent Literature

Patent Document 1: Japanese Patent Application published as No. H7-79321.

SUMMARY OF THE INVENTION

Technical Problem

For example, in conveyed-document reading in which a document conveyed by a document conveying unit is read, if the document conveying unit has a fault, the document D being conveyed is likely to skew. For example, if any of various rollers (such as conveying rollers for conveying the document) in the document conveying unit is shaky or worn, the document D being conveyed is likely to skew.

In a case where the document skews due to a fault in the document conveying unit, the user needs to request maintenance from the service provider that provides maintenance services for the image forming apparatus so that maintenance will be done on the image forming apparatus. However, it is difficult for the user to judge whether the document skews due to a fault in the document conveying unit or any other cause (such as improper placement of the document). Thus, even if the document conveying unit has a fault, it is often left unattended to.

To solve the problems mentioned above, the present invention aims to provide an image forming apparatus that can reduce the chance of a document conveying unit with a fault being left unattended to.

Means for Solving the Problem

To achieve the above aim, according to the present invention, an image forming apparatus includes: a document conveying unit which conveys a document; an image reading section which reads a document being conveyed; a storage which stores data; a controller which finds a skew angle indicating how each read document is skewed relative to the main scanning direction or the sub scanning direction, stores angle data as to the skew angle in the storage, generates distribution data indicating the distribution of the skew angle corresponding to documents read during a previously defined period, performs a previously defined test to check whether or not there is a significant difference between the distribution data and reference distribution data previously stored in the storage, and judges whether or not the image forming apparatus needs maintenance based on the result of the test; and a communicator which is communicably connected to a service system of a service provider that provides maintenance services for the image forming apparatus, and transmits to the service system a maintenance request notification to request maintenance of the image forming apparatus when the controller judges that the image forming apparatus needs maintenance.

In the configuration according to the present invention, the controller performs a significant difference test to check whether or not there is a significant difference between the target distribution data and the reference distribution data. Here, if the document conveying unit has no fault (if the document conveying unit conveys the document normally), the document being conveyed is unlikely to skew. However, if the document conveying unit has a fault, the document being conveyed is likely to skew. Thus, a significant difference arises between the target distribution data and the reference distribution data. Accordingly, the controller performs a significant difference test to check whether or not there is a significant difference between the target distribution data and the reference distribution data, and based on the result of the test judges whether or not the image forming apparatus needs maintenance. If the image forming apparatus is judged to need maintenance, a maintenance request notification is transmitted to the service system. In this way, the user does not need to judge whether or not a fault in the document conveying unit is causing the document D to skew; when the document conveying unit has a fault, a maintenance request notification is transmitted automatically to the service system. On receiving the maintenance request notification, the service provider visits the site of the image forming apparatus and does maintenance on the image forming apparatus (document conveying unit). It is thus possible to reduce the chance of the document conveying unit with a fault being left unattended to.

Advantageous Effects of the Invention

According to the present invention, it is possible to reduce the chance of a document conveying unit with a fault being left unattended to.

DESCRIPTION OF EMBODIMENTS

<Overall Configuration of an Image Forming Apparatus>

Figure 1:
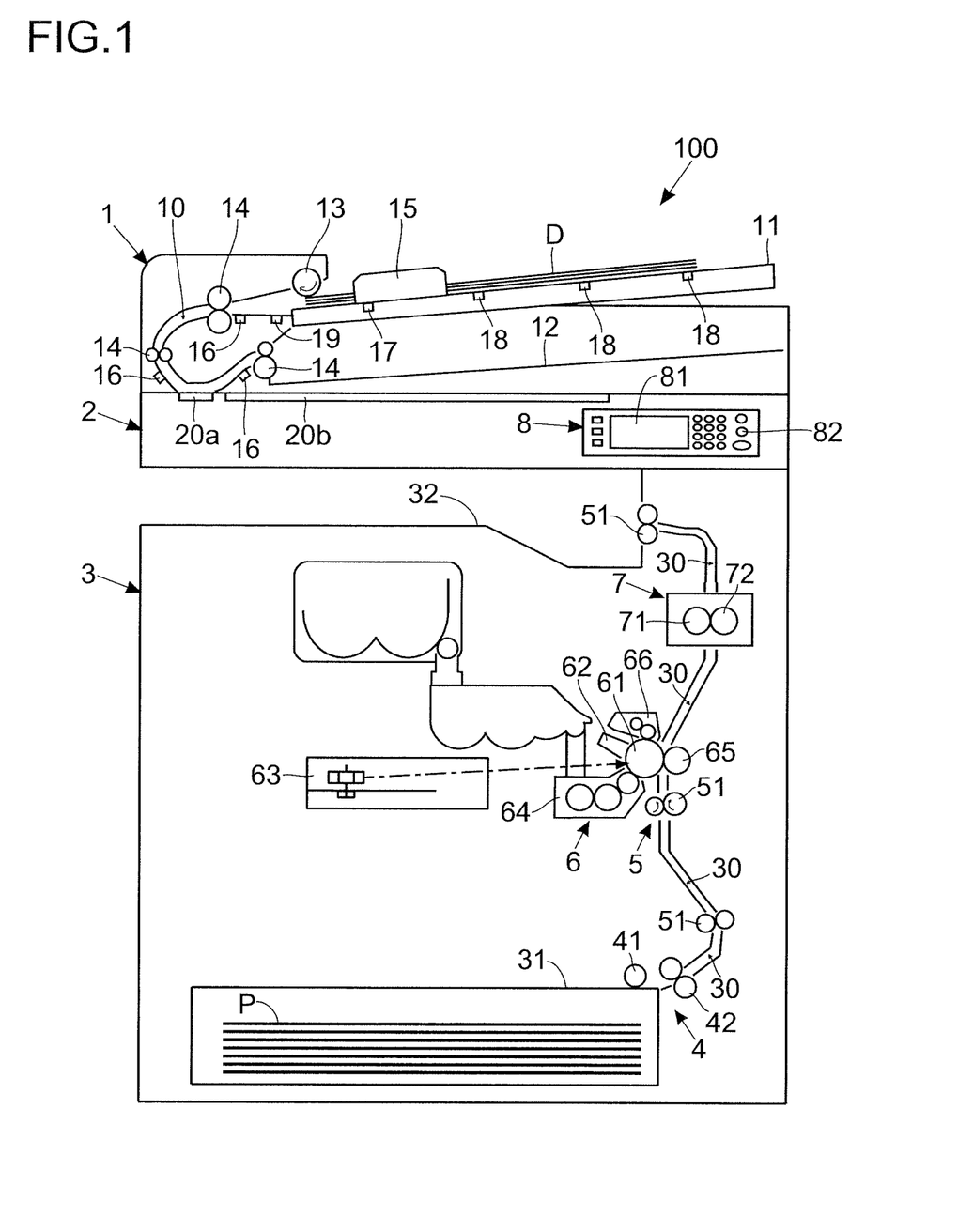
FIG. 1 is a schematic diagram of an image forming apparatus according to one embodiment of the present invention.

As shown in FIG. 1, according to one embodiment, an image forming apparatus 100 includes a document conveying unit 1, an image reading section 2, a printing section 3 (a sheet feed portion 4, a sheet conveying portion 5, an image forming portion 6, and a fixing portion 7), and an operation panel 8.

The image reading section 2 has a frame (reading stage), which has fitted to it a contact glass 20a for conveyed-document reading and a contact glass 20b for placed-document reading. The image reading section 2 can thus perform conveyed-document reading, in which it reads a document D passing across the contact glass 20a, and placed-document reading, in which it reads a document D placed on the contact glass 20b. Inside the frame of the image reading section 2, there is provided, though not illustrated, an image sensor or the like for optically reading the document D.

The document conveying unit 1 is arranged so that it can swing (open and close) relative to the frame of the image reading section 2. The document conveying unit 1 includes a document placement tray 11, a document discharge tray 12, a sheet feed roller 13, and pairs of conveying rollers 14. In the document conveying unit 1, there is provided a document conveying passage 10, which leads from the document placement tray 11 via a predetermined position on the contact glass 20a (the reading position during conveyed-document reading) to the document discharge tray 12.

On the document placement tray 11, a document D before reading is placed; onto the document discharge tray 12, a document D after reading is discharged. The sheet feed roller 13 is disposed at the most upstream position in the document conveying passage 10. The conveying rollers 14 are provided in a plurality of pairs along the document conveying passage 10.

During conveyed-document reading, the sheet feed roller 13 and the pairs of conveying rollers 14 are driven to rotate. As a result, the document D placed on the document placement tray 11 is fed into the document conveying passage 10 by the sheet feed roller 13. The document D fed into the document conveying passage 10 is conveyed along the document conveying passage 10 by the pairs of conveying rollers 14. The document D conveyed along the document conveying passage 10 passes through the predetermined position on the contact glass 20a (the reading position during conveyed-document reading), and is eventually discharged onto the document discharge tray 12. When the document D passes through the predetermined position on the contact glass 20a, the image reading section 2 reads the document D.

Here, the document placement tray 11 is provided with a pair of guide plates 15, which abuts on the document D from opposite sides to position it in the main scanning direction (the direction perpendicular to the plane of FIG. 1). FIG. 1 only shows one of the pair of guide plates 15. The pair of guide plates 15 is slidable in a coordinated manner in the main scanning direction; as one guide plate 15 is slid, the other guide plate 15 slides. To be noted here is that the two guide plates 15 slide in opposite directions. That is, the two guide plates 15 slide either in the directions in which they move farther away from each other or in the directions in which they move closer to each other.

The printing section 3 is composed of the sheet feed portion 4, the sheet conveying portion 5, the image forming portion 6, and the fixing portion 7. The printing section 3 conveys a sheet P along a sheet conveying passage 30, and prints on the sheet P an image based on image data obtained resulting from the image reading section 2 reading the document D.

The sheet feed portion 4 feeds sheets P stored in a sheet cassette 31 into the sheet conveying passage 30. The sheet feed portion 4 includes a pickup roller 41 and a pair of sheet feed rollers 42. The pickup roller 41 feeds a sheet P stored in the sheet cassette 31 to the sheet feed nip between the pair of sheet feed rollers 42. The pair of sheet feed rollers 42 feeds the sheet P that has entered the sheet feed nip into the sheet conveying passage 30.

The sheet conveying portion 5 conveys the sheet P fed into the sheet conveying passage 30 to a transfer nip and then to a fixing nip in this order, and then discharges it onto a discharge tray 32. The sheet conveying portion 5 includes a plurality of conveying rollers 51 disposed along the sheet conveying passage 30.

The image forming portion 6 forms a toner image based on the image data, and transfer the toner image to the sheet P. The image forming portion 6 includes a photosensitive drum 61, a charging device 62, an exposing device 63, a developing device 64, a transfer roller 65, and a cleaning device 66.

During image formation, the photosensitive drum 61 rotates, and the charging device 62 electrostatically charges the surface of the photosensitive drum 61 to a predetermined potential. The exposing device 63 scans the surface of the photosensitive drum 61 with light for exposure, and forms an electrostatic latent image on the surface of the photosensitive drum 61. The developing device 64 feeds toner to the electrostatic latent image formed on the surface of the photosensitive drum 61, and thereby develops the electrostatic latent image.

The transfer roller 65 is kept in pressed contact with the surface of the photosensitive drum 61, and forms the transfer nip with the photosensitive drum 61. Thus, when the sheet P enters the transfer nip, the toner image on the surface of the photosensitive drum 61 is transferred to the sheet P. On completion of the transfer of the toner image to the sheet P, the cleaning device 66 removes the toner and the like left behind on the surface of the photosensitive drum 61.

The fixing portion 7 heats and presses, and thereby fixes, the toner image transferred to the sheet P. The fixing portion 7 includes a heating roller 71 and a pressing roller 72. The heating roller 71 incorporates a heat source. The pressing roller 72 is kept in pressed contact with the heating roller 71, and forms the fixing nip with the heating roller 71. As the sheet P having the toner image transferred to it passes through the fixing nip, it is heated and pressed.

The operation panel 8 includes a touch panel display 81. The touch panel display 81 displays software keys, messages, and the like, and accepts various settings as to the image forming apparatus 100 from a user. The operation panel 8 is further provided with hardware keys 82 such as a Start key and a numerical keypad. The operation panel 8 corresponds to an "acceptor".

For example, when a job accompanied by conveyed-document reading (such as a copy job or a scan job) is about to be executed, the operation panel 8 accepts, from the user, a selection of the reading mode in which to read the document D, out of a normal reading mode and a mixed reading mode. The normal reading mode is a mode for reading a document D comprising a plurality of sheets of the same document size. The mixed reading mode is a mode for reading a document D comprising a plurality of sheets of varying document sizes.

The mixed reading mode divides into a constant-width mixed mode and a varying-width mixed mode. Accordingly, when the mixed reading mode is selected as the reading mode, the operation panel 8 accepts, from the user, a selection of the reading mode in which to read the document D, out of the constant-width mixed mode and the varying-width mixed mode. The constant-width mixed mode is a mode for reading a document D comprising a plurality of sheets of an equal document size in the main scanning direction but varying document sizes in the sub scanning direction (the direction perpendicular to the main scanning direction). The varying-width mixed mode is a mode for reading a document D comprising a plurality of sheets of varying document sizes in the main scanning direction.

When a job accompanied by conveyed-document reading is about to be executed, the operation panel 8 also accepts, from the user, settings as to the type of the document D. The settings as to the type of the document D include, but are not limited to, a setting of sheet thickness (whether it comprises thick sheets or regular sheets), and a setting of whether the document D is a photographic document or a text document.

<Hardware Configuration of an Image Forming Apparatus>

Figure 2:
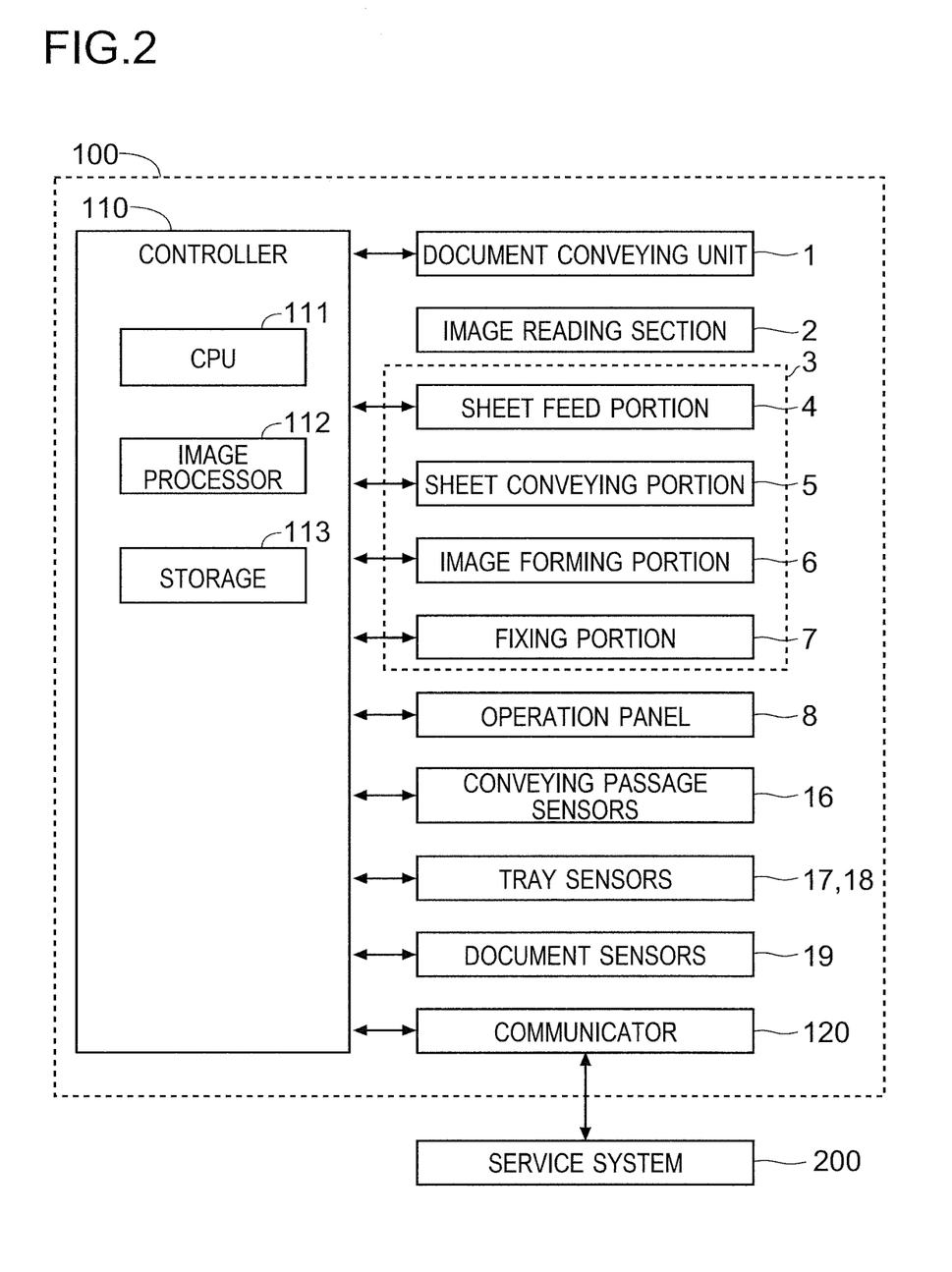
FIG. 2 is a diagram showing the hardware configuration of the image forming apparatus according to the embodiment of the present invention.

As shown in FIG. 2, the image forming apparatus 100 includes a controller 110. The controller 110 includes a CPU 111, an image processor 112, and a storage 113. The image processor 112 comprises, for example, an ASIC dedicated to image processing, and processes image data with various kinds of image processing (such as enlargement or reduction, density conversion, and data format conversion). The storage 113 includes ROM, RAM, a HDD, and the like. The storage 113 stores control programs and data. Based on the control programs and data stored in the storage 113, the controller 110 controls relevant blocks in the image forming apparatus 100.

Specifically, the controller 110 is connected to the document conveying unit 1 and the image reading section 2, and controls the document conveying operation by the document conveying unit 1 and the document reading operation by the image reading section 2. The controller 110 is connected also to the printing section 3 (the sheet feed portion 4, the sheet conveying portion 5, the image forming portion 6, and the fixing portion 7), and controls the printing operation by the printing section 3. The controller 110 is connected further to the operation panel 8. The controller 110 controls the display operation by the operation panel 8, and senses operations performed on the operation panel 8 (touch operations on the touch panel display 81 and pressing operations on the hardware keys 82).

The controller 110 is connected to a communicator 120 as well. The communicator 120 is communicably connected, for example via an external network such as the Internet, to a service system 200 of a service provider that provides maintenance services for the image forming apparatus 100. The service system 200 comprises a personal computer, a server, or the like. The controller 110 communicates with the service system 200 via the communicator 120.

<Jam Sensing in the Document Conveying Passage>

The image forming apparatus 100 senses a jam in the document conveying passage 10. For jam sensing in the document conveying passage 10, the document conveying passage 10 is provided with a plurality of conveying passage sensors 16 (see FIGS. 1 and 2). The plurality of conveying passage sensors 16 are disposed at different sensing positions along the document conveying passage 10, and are each an optical sensor that varies its output value according to the presence or absence of a document D at the corresponding sensing position.

The plurality of conveying passage sensors 16 are connected to the controller 110. When a job accompanied by conveyed-document reading is executed, the controller 110 start to count time when the arrival of the leading edge of a document D is sensed at the sensing position of a particular one (referred to as the first sensor) of the plurality of conveying passage sensors 16. When, after the arrival of the leading edge of the document D is sensed at the sensing position of the first sensor, a predetermined time has elapsed, the controller 110 senses whether or not the leading edge of the document D has arrived at the sensing position of a conveying passage sensor 16 (referred to as the second sensor) disposed on the downstream side of the first sensor in the conveying direction. If the arrival of the leading edge of the document D is not sensed, the controller 110 judges that a jam has occurred in the document conveying passage 10. Here, the predetermined time is the time required for the document D to pass from the sensing position of the first sensor to the sensing position of the second sensor, and is a time that can be calculated previously based on the distance between the sensing position of the first sensor and the sensing position of the second sensor and the document conveying speed.

<Sensing the Document Size>

The controller 110 senses the size of a document D as the target of reading. For the sensing of the size of the document D, the document placement tray 11 is provided with a tray sensor 17 for sensing the size of the document D in the main scanning direction and tray sensors 18 for sensing the size of the document D in the sub scanning direction perpendicular to the main scanning direction (see FIGS. 1 and 2). The tray sensors 17 and 18 are connected to the controller 110.

The tray sensor 17 varies its output value according to the position of the pair of guide plates 15 in the main scanning direction. Based on the output value of the tray sensor 17, the controller 110 senses the main-scanning-direction size of the document D as the target of reading.

The plurality of tray sensors 18 are disposed at predetermined intervals from each other in the sub scanning direction. The plurality of tray sensors 18 are, for example, optical sensors of an actuator type, and vary their output values as a result of the document D placed on the document placement tray 11 pushing actuators. By identifying, out of the plurality of tray sensors 18, the tray sensors 18 that yield an H level (or an L level), the controller 110 senses the sub-scanning-direction size of the document D as the target of reading.

Here, in the normal reading mode, the plurality of sheets in the document D placed on the document placement tray 11 are all of the same size. Accordingly, in the normal reading mode, the controller 110 senses the size of the document D based on the output values of the tray sensors 17 and 18. In contrast, in the mixed reading mode (the constant-width mixed mode and the varying-width mixed mode), the plurality of sheets in the document D placed on the document placement tray 11 are of varying sizes. Accordingly, in the mixed reading mode, the controller 110 senses the size of the document D in a manner different from the one in which it does in the mixed reading mode.

First, one example of document D size sensing in the constant-width mixed mode will be described.

In the constant-width mixed mode, the controller 110 senses the main-scanning-direction size of the document D based on the output value of the tray sensor 17 (the position of the guide plates 15). That is, the size in the main scanning direction is sensed in the same manner as in the normal reading mode.

On the other hand, when the document D starts to be conveyed, the controller 110 starts to count time on sensing the arrival of the leading edge of the document D at the sensing position of a particular one of the plurality of conveying passage sensors 16 (or of document sensors 19, which will be described later) to measure the time that elapses before sensing the passage of the trailing edge of the document D at the same sensing position. The controller 110 then multiplies the measured time by the document conveying speed (a speed defined previously), and takes the calculated value as the sub-scanning-direction size of the document D.

Next, one example of document D size sensing in the varying-width mixed mode will be described.

Figure 3:
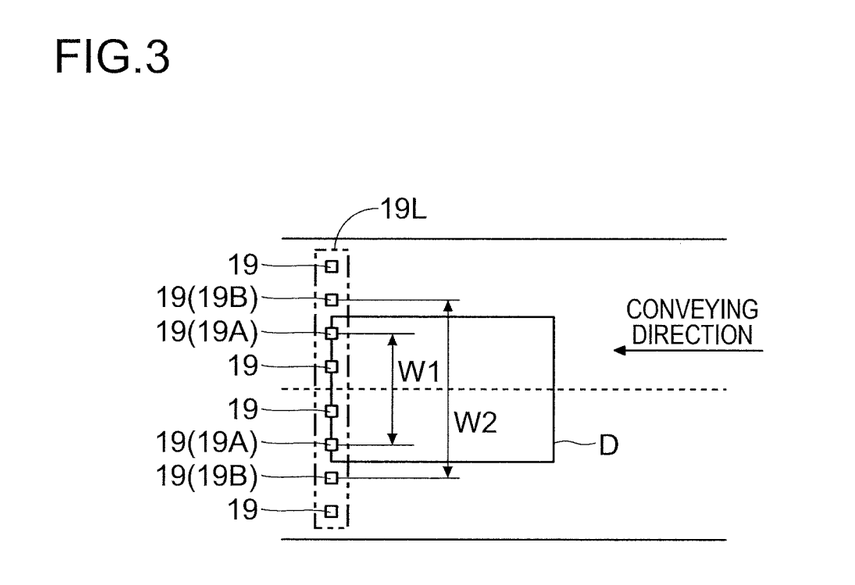
FIG. 3 is a diagram illustrating how the size of a document is sensed in the image forming apparatus according to the embodiment of the present invention.

For the sensing of the size of the document D in the varying-width mixed mode, as shown in FIGS. 1 to 3, the document conveying passage 10 is provided with a sensor array 19L comprising a plurality of document sensors 19 arranged in a row in the main scanning direction. The plurality of document sensors 19 are each an optical sensor that varies its output value according to the presence or absence of a document D at the corresponding sensing position, and are connected to the controller 110.

The sensor array 19L is disposed such that its middle in the main scanning direction (indicated by a dot line in FIG. 3) coincides with the middle of the document conveying path in the main scanning direction. The guide plates 15 regulates the position of the document D on the document placement tray 11 in the main scanning direction such that the middle of the document D coincides with the middle of the document conveying path.

With this configuration, when the document D arrives at the sensing position of the sensor array 19L, different ones of the document sensors 19 output a value indicating the presence of the document D. Accordingly, by identifying, out of the plurality of document sensors 19, the document sensors 19 that output the value indicating the presence of the document, the controller 110 senses the main-scanning-direction size of the document D.

Specifically, the controller 110 identifies, out of the document sensors 19 that output the value indicating the presence of the document D, the pair of document sensors 19 (referred to as the document sensors 19A) that is located outermost in the main scanning direction of the document D, and in addition identifies the pair of document sensors 19 (referred to as the document sensors 19B) that is located one-pair further outward of the pair of document sensors 19A. Then the controller 110 finds a range of size of which the lower limit equals the interval W1 between the pair of document sensors 19A and the upper limit W2 equals the interval W2 between the pair of document sensors 19B.

The controller 110 senses the sub-scanning-direction size of the document D in the same manner as that in which it does in the constant-width mixed mode (it senses the sub-scanning-direction size of the document D based on the output values of the conveying passage sensors 16). The controller 110 then identifies, out of regular sizes with the same sub-scanning-direction size as the one sensed based on the output values of the conveying passage sensors 16, one with a main-scanning-direction size within the above-mentioned range of size, and recognizes the main-scanning-direction size of the identified regular size as the main-scanning-direction size of the document D.

<Skew Angle of the Document>

Figure 4:
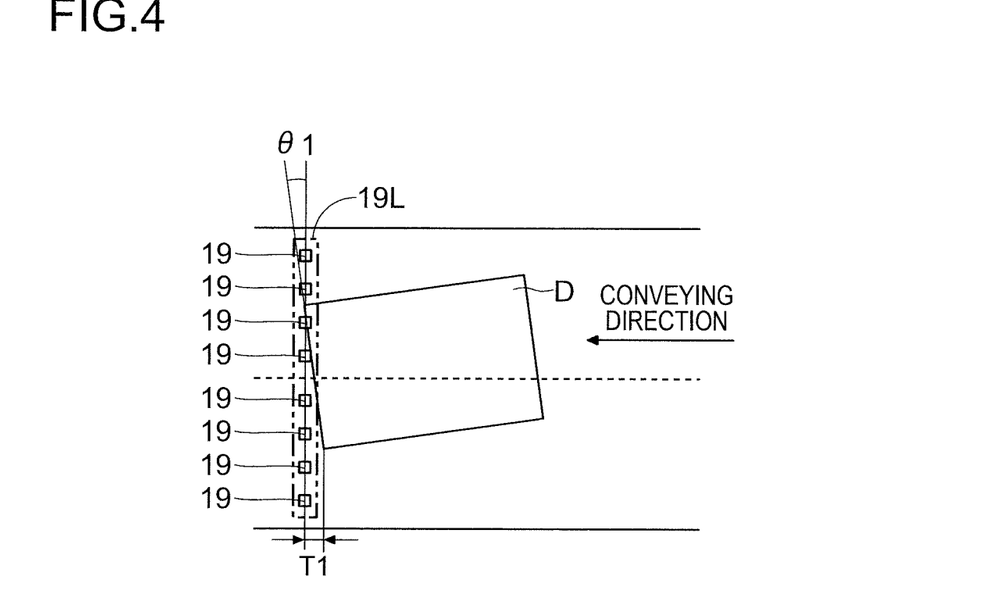
FIG. 4 is a diagram illustrating how the skew angle of a document is sensed in the image forming apparatus according to the embodiment of the present invention.
Figure 5:
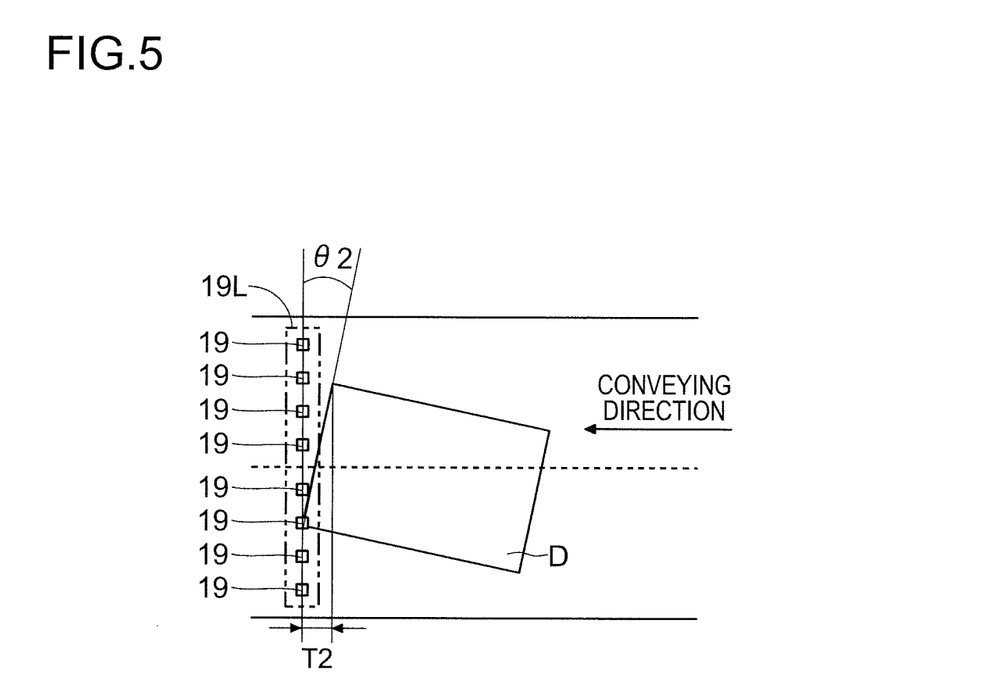
FIG. 5 is a diagram illustrating how the skew angle of a document is sensed in the image forming apparatus according to the embodiment of the present invention.

The controller 110 finds a skew angle that indicates how the read document D is skewed relative to the main or sub scanning direction based on the output values of the plurality of document sensors 19 constituting the sensor array 19L. This will now be described specifically with reference to FIGS. 4 and 5. FIG. 4 illustrates a state where a document D is skewed by an angle of $\theta 1$ in the counter-clockwise direction relative to the main scanning direction. FIG. 5 illustrates a state where a document D is skewed by an angle of $\theta 2$ in the clockwise direction relative to the main scanning direction.

As shown in FIGS. 4 and 5, when a document D being conveyed is skewed, a temporal deviation (time lag) arises among the time points at which the plurality of document sensors 19 output the value indicating the presence of the document D. The temporal deviation increases as the document D is more skewed. In FIG. 4, the geometric deviation is identified as T1. In FIG. 5, the geometric deviation is identified as T2.

The controller 110 holds in the storage 113 the time points at which the plurality of document sensors 19 respectively output the value indicating the presence of the document D. The controller 110 then finds the time lag between, out of the time points held in the storage 113, the earliest and latest time points. Having found the time lag between the earliest and latest time points, the controller 110 finds the skew angle of the document D based on correlation information in which the correlation between the skew angle and the time lag is defined. The correlation information is stored in the storage 113 previously. The correlation between the skew angle and the time lag defined in the correlation information is defined previously by experiments, theoretically, or by simulations.

The controller 110 also identifies, out of the plurality of document sensors 19, the document sensor 19 that has output the value indicating the presence of the document D at the earliest time point and the document sensor 19 that has output the value indicating the presence of the document D at the latest time point. Based on the positional relationship between those two document sensors 19, the controller 110 finds whether the document D is skewed in the clockwise or counter-clockwise direction. For example, if the document sensor 19 that has output the value indicating the presence of the document D at the latest time point is located on the upper side of the document sensor 19 that has output the value indicating the presence of the document D at the earliest time point (if the document D is skewed as shown in FIG. 5), the controller 110 judges that the document D is skewed in the clockwise direction. For example, a skew angle in, of the clockwise and counter-clockwise directions, one direction is given a positive value while a skew angle in the other direction is given a negative value.

The skew angle of the document D may instead be found based on the image data of the read document D. In that case, the coordinates of the pixels corresponding to an edge of the document D are found. For example, the controller 110 calculates the differences in pixel values between pixels adjacent in the sub scanning direction, and finds the coordinates of, out of pixels between which the differences are equal to or larger than a previously defined threshold value, a predetermined number of pixels located on the head side in the conveying direction. Then the controller 110 finds a regression line based on the coordinates of the pixels corresponding to the edge of the document D, and finds the skew angle of the document D relative to the main scanning direction.

<Significant Difference Test>

When a job accompanied by conveyed-document reading is executed, the controller 110 finds the skew angle for each read document D and stores angle data as to the found skew angle in the storage 113. That that time, the controller 110 adds property information to the angle data. The property information added to the angle data includes size information, which indicates the size of a given document D; type information, which indicates the type of a given document D; and mode information, which indicates the reading mode in which a given D was read.

Figure 6:
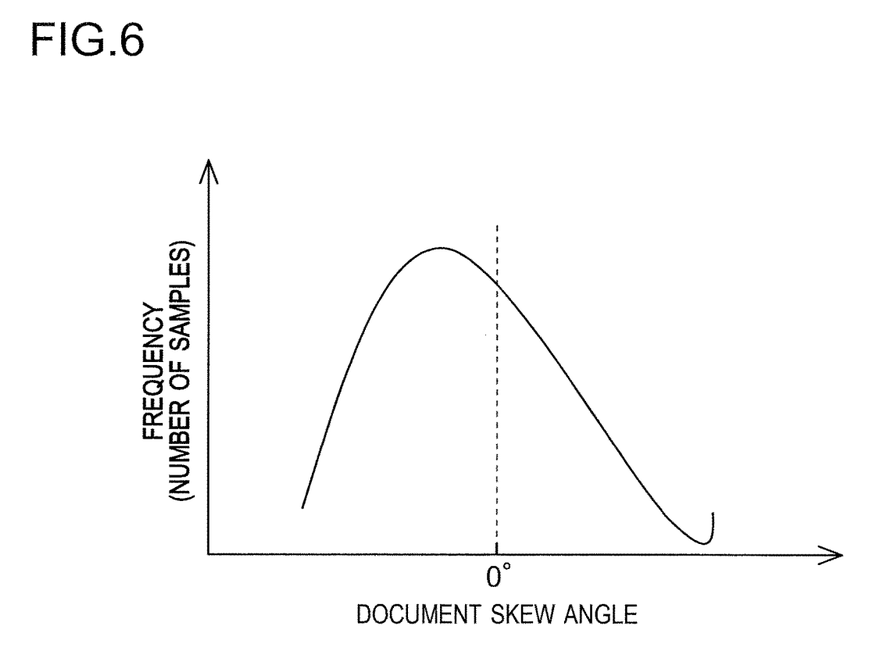
FIG. 6 is a diagram showing one example of target distribution data generated in the image forming apparatus according to the embodiment of the present invention.

Every time a previously defined period (hereinafter referred to as the predetermined period) elapses, the controller 110 generates distribution data that indicates the distribution of skew angles with respect to the documents D read in the predetermined period. The distribution data thus generated will be taken as the target (hereinafter referred to also as the target distribution data) of a significant difference test, which will be described later. One example of the target distribution data is shown in FIG. 6. There is no particular restriction on the length of the predetermined period. The predetermined period is, for example, one month.

When generating the target distribution data, the controller 110 classifies the angle data as to skew angles stored in the storage 113 into groups according to previously defined criteria. Specifically, referring to the property information, the controller 110 classifies the skew angles stored in the storage 113 into groups according to document D size, document D type, and reading mode. The controller 110 generates distribution data for each group, and stores the group-by-group distribution data as the target distribution data in the storage 113.

Suppose, for example, that, during the predetermined period, a document D is read in the normal reading mode and regular sheets of the A4 vertical size and regular sheets of the A4 horizontal size are the target of reading (assuming that no reading in any other reading mode is performed and that no reading of a document D of any other size or type is performed).

In this case, first, the controller 110 generates distribution data by extracting, as a sample, angle data to which information indicating the A4 vertical size is added as size information (property information) out of the angle data of skew angles stored in the storage 113. The controller 110 also generates distribution data by extracting, as a sample, angle data to which information indicating the A4 horizontal size is added as size information (property information) out of the angle data of skew angles stored in the storage 113. Next, the controller 110 generates distribution data by extracting, as a sample, angle data to which information indicating regular sheets is added as type information (property information) out of the angle data of skew angles stored in the storage 113. Subsequently, the controller 110 generates distribution data by extracting, as a sample, angle data to which information indicating the normal reading mode is added as reading mode information (property information) out of the angle data of skew angles stored in the storage 113. Thus, in this case, the controller 110 generates four sets of distribution data.

Figure 7:
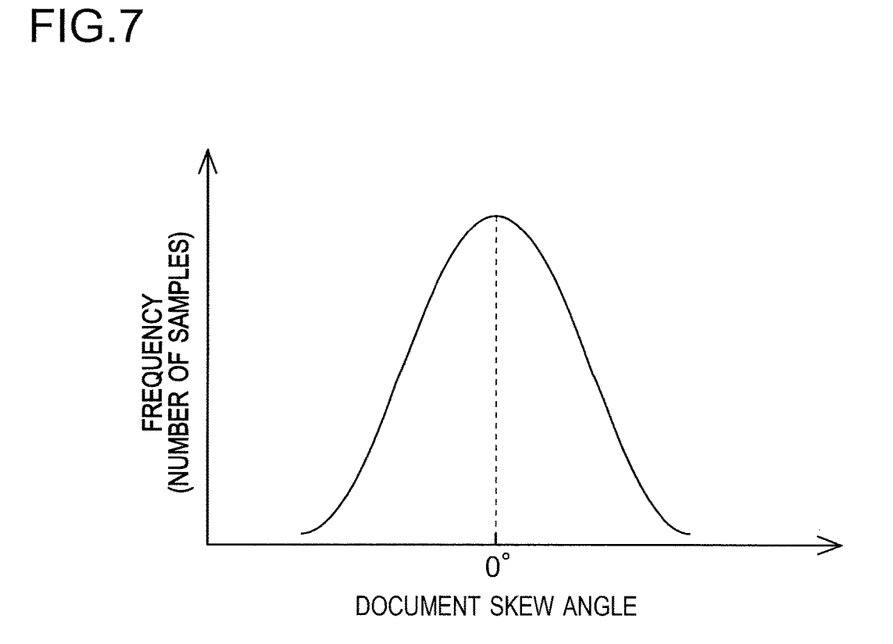
FIG. 7 is a diagram showing one example of reference distribution data previously stored in the image forming apparatus according to the embodiment of the present invention.

Here, in the storage 113, there is previously stored reference distribution data with which the target distribution data will be compared in significant difference tests, which will be described later. An example of the reference distribution data is shown in FIG. 7. The reference distribution data is created previously before the shipment of the image forming apparatus 100, and is stored in the storage 113. The reference distribution data is created, for example, based on skew angles of documents D obtained through actual reading and conveying on the image forming apparatus 100 before shipment. The reference distribution data is created for each of different document D sizes, different document D types, and different reading modes.

Having stored the distribution data created for each group as the target distribution data in the storage 113, the controller 110 performs a significant difference test to check whether or not there is a significant difference between the target distribution data and the reference distribution data. There is no particular restriction on the testing method; a known testing method such as the t-test can be used. The t-test is a common method for testing whether or not the difference between the averages of two normal distributions falls in a coincidental range.

When performing a significant difference test, the controller 110 extracts one set of target distribution data, and extracts a set of reference distribution data that corresponds to the extracted set of target distribution data. Then the controller 110 performs a significant difference test by using the thus extracted two sets of distribution data. On completing the significant difference test with the first set of target distribution data, the image forming apparatus 100 extracts untested target distribution data from the rest of the target distribution data, and performs a significant difference test with the so extracted target distribution data. Thereafter, the controller 110 repeats significant difference tests until no untested target distribution data remains.

<Maintenance Request Notification>

When the image forming apparatus 100 (document conveying unit 1) has a fault, a document D being conveyed is likely to skew (skewing is more likely to occur). For example, when the document conveying passage 10 (or the guides around it) in the document conveying unit 1 is deformed or otherwise faulty, a document D being conveyed is likely to skew. Also when any of the various rollers (such as the sheet feed roller 13) in the document conveying unit 1 is displaced, shaky, or worn, a document D being conveyed is likely to skew.

Thus, when the image forming apparatus 100 (document conveying unit 1) has a fault, a document D is likely to skew, and this results in an increased number of sets of target distribution data exhibiting a significant difference from the reference distribution data. In that case, it is advisable that maintenance be done on the image forming apparatus (document conveying unit 1).

Accordingly, after performing significant difference tests with all the target distribution data generated based on the skew angles of the documents D read during the predetermined period, the controller 110 checks whether or not the number of sets of target distribution data that exhibit a significant difference from the reference distribution data has become equal to or larger than a previously defined threshold number. For example, the larger the number of sets of target distribution data is, the larger the controller 110 sets the threshold number to be. The threshold number can be, but not limited to, about one-half of the number of sets of target distribution data. Instead, the distribution data is, the larger the controller 110 sets the threshold number to be. Or the threshold number may be equal to the number of sets of target distribution data.

Figure 8:
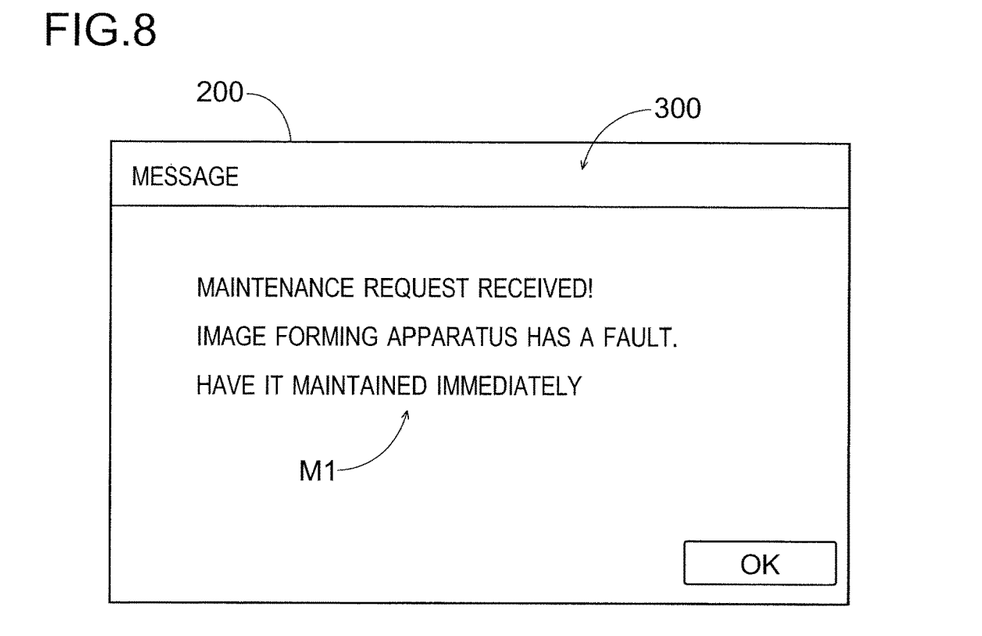
FIG. 8 is a diagram showing one example of the screen displayed on a service system on receiving a maintenance request notification transmitted from the image forming apparatus according to the embodiment of the present invention.

If the number of sets of target distribution data that exhibit a significant difference from the reference distribution data is equal to or larger than the threshold number, the controller 110 instructs the communicator 120 to transmit a maintenance request notification to the service system 200. On receiving the maintenance request notification, the service system 200 displays a notice screen 300 as shown in FIGS. 8 and 9.

For example, if all the target distribution data exhibits a significant difference, the image forming apparatus 100 is highly likely to have a fault. Thus, maintenance has to be done on the image forming apparatus 100 immediately. Accordingly, in this case, the controller 110 instructs the communicator 120 to transmit to the service system 200 a maintenance request notification containing an instruction to display on the notice screen 300 a message M1 as shown in FIG. 8. Thus, maintenance can be done on the image forming apparatus 100 immediately.

Figure 9:
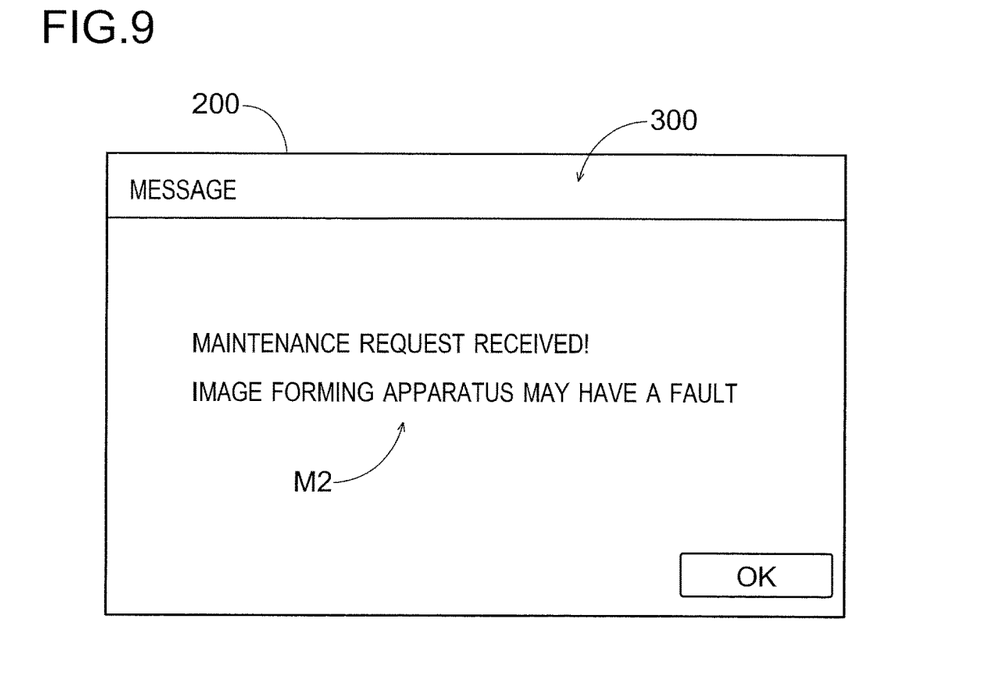
FIG. 9 is a diagram showing one example of the screen displayed on the service system on receiving a maintenance request notification transmitted from the image forming apparatus according to the embodiment of the present invention.

On the other hand, if the number of sets of target distribution data that exhibit a significant difference is equal to or larger than the threshold number but there is even one set of target distribution data that does not exhibit a significant difference, the controller 110 instructs the communicator 120 to transmit to the service system 200 a maintenance request notification containing an instruction to display on the notice screen 300 a message M2 as shown in FIG. 9. That is, in this case, only notice to the effect that the image forming apparatus 100 may have a fault is given.

Here, if jams are occurring frequently in the document conveying unit 1 irrespective of the size and type of the document D, the image forming apparatus 100 (document conveying unit 1) is highly likely to have a fault. Therefore, it is advisable that maintenance be done on the image forming apparatus 100 promptly. Accordingly, the image forming apparatus 100 finds the number of jam occurrences in the document conveying unit 1 during the predetermined period for each size and each type of the document D. When all the numbers of jam occurrences found for different sizes and different types of the document D are equal to or larger than a previously defined threshold number, the controller 110 instructs the communicator 120 to transmit to the service system 200 a maintenance request notification containing an instruction to display the notice screen 300 shown in FIG. 8. In this case, the controller 110 performs no significant difference test.

Figure 10:
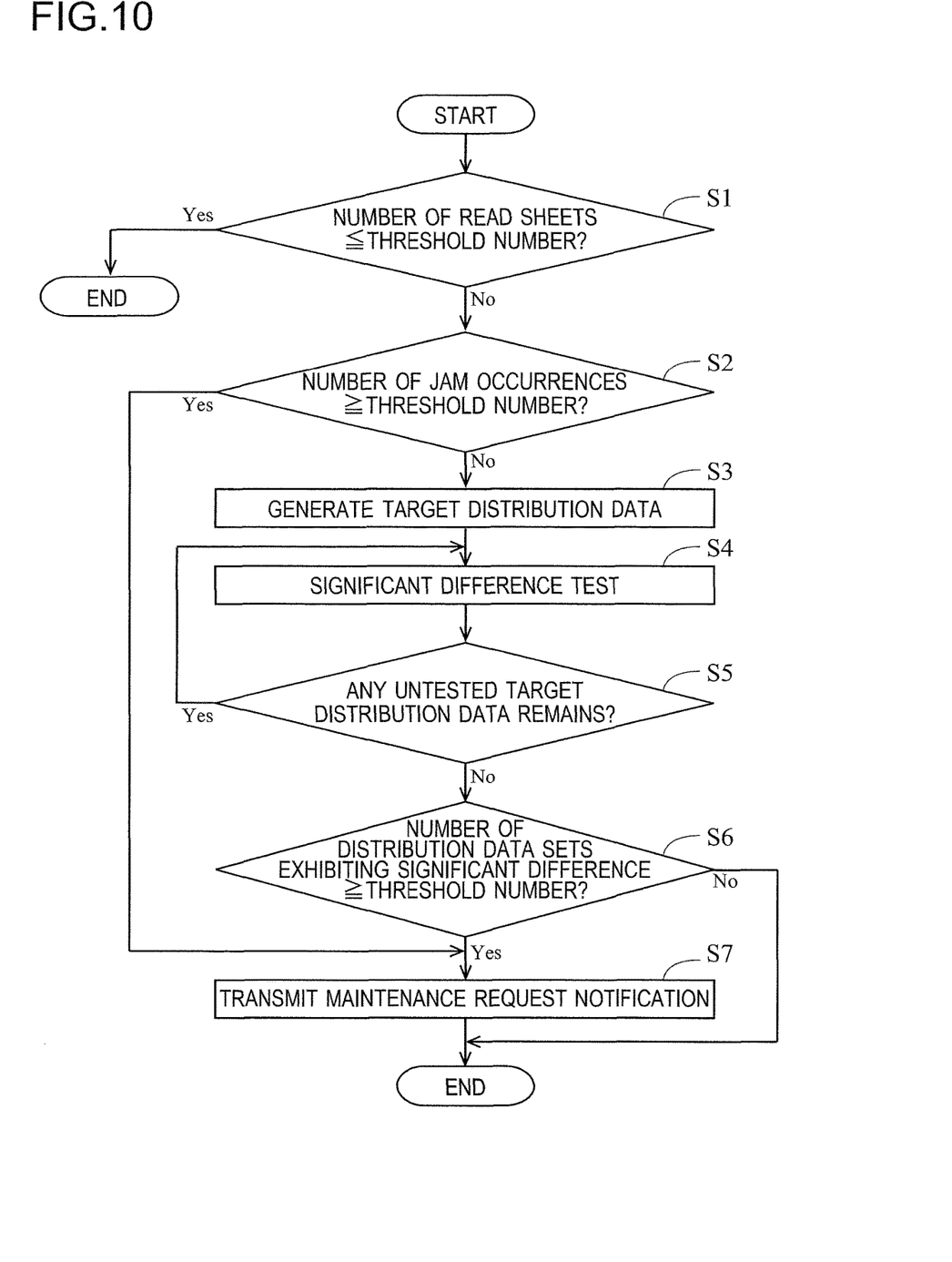
FIG. 10 is a flow chart illustrating the flow of control that takes place when significant difference tests are performed in the image forming apparatus according to the embodiment of the present invention.

Now, with reference to FIG. 10, a description will be given of the flow of control that takes place when a significant difference test is performed on the image forming apparatus 100. The flow shown in FIG. 10 starts when a predetermined period has elapsed from the date of delivery of the image forming apparatus 100, or when the predetermined period has elapsed from the date on which the previous significant difference test was performed.

At step S1, the controller 110 checks whether or not the number of sheets (read sheets) in the documents D read during the predetermined period is equal to or smaller than a previously defined threshold number. If the controller 110 finds the number of read sheets equal to or smaller than the threshold number, the flow ends (no significant difference test is performed). Here, if the number of sheets in the documents D read during the predetermined period is too small, significant difference tests cannot be performed with satisfactory reliability. Accordingly, if the number of read sheets is equal to or smaller than the threshold number, no significant difference test is performed. The threshold number is several hundred (for example, one hundred).

If, at step S1, the controller 110 finds the number of read sheets larger than the threshold number, the flow proceeds to step S2. At step S2, the controller 110 checks whether or not all the numbers of jam occurrences found for different sizes and different types of the document D are equal to or larger than a threshold number. If the controller 110 finds the numbers of jam occurrences smaller than the threshold number, the flow proceeds to step S3.

At step S3, the controller 110 classifies the skew angles stored in the storage 113 into groups according to document D size, document D type, and reading mode to generates distribution data for each group (generates target distribution data). The group-by-group distribution data thus generated is stored as target distribution data in the storage 113.

Subsequently, at step S4, the controller 110 performs a significant difference test to check whether or not there is a significant difference between the target distribution data and reference distribution data. Then, at step S5, the controller 110 checks whether or not there remains any untested target distribution data with which no significant difference test has yet been performed. If the controller 110 finds that there still remains untested target distribution data, the flow proceeds to step S4. In this case, the image forming apparatus 100 performs a significant difference test with the untested target distribution data. On the other hand, if, at step S5, the image forming apparatus 100 finds that there remains no untested target distribution data, the flow proceeds to step S6.

At step S6, the controller 110 checks whether or not the number of sets of target distribution data that exhibit a significant difference is equal to or larger than a threshold number. If the controller 110 finds the number of sets of target distribution data that exhibit a significant difference equal to or larger than the threshold number, the flow proceeds to step S7. In a case where the threshold number equals the number of sets of target distribution data, only if all the sets of target distribution data exhibit a significant difference, the flow proceeds to step S7. Also if, at step S2, the image controller 110 finds the number of jam occurrences equal to or larger than the threshold number, the flow proceeds to step S7. At step S7, the controller 110 instructs the communicator 120 to transmit a maintenance request notification to the service system 200.

If, at step S6, the controller 110 finds the number of sets of target distribution data that exhibit a significant difference is smaller than the threshold number, the flow ends (no maintenance request notification is transmitted). That is, even when there is target distribution data that exhibits a significant difference, if the total number of sets of target distribution data that exhibit a significant difference is smaller than the threshold number, no maintenance request notification is transmitted.

As described above, an image forming apparatus 100 according to one embodiment includes: a document conveying unit 1 which conveys a document D; an image reading section 2 which reads a document D being conveyed; a storage 113 which stores data; a controller 110 which finds a skew angle indicating how each read document D is skewed relative to the main scanning direction or the sub scanning direction, stores angle data as to the skew angle in the storage 113, generates, as target distribution data, distribution data indicating the distribution of the skew angle corresponding to documents read during a predetermined period (previously defined period), performs a previously defined significant difference test (test) to check whether or not there is a significant difference between the target distribution data and reference distribution data previously stored in the storage 113, and judges whether or not the image forming apparatus 100 needs maintenance based on the result of the test; and a communicator 120 which is communicably connected to a service system 200 of a service provider that provides maintenance services for the image forming apparatus 100, and transmits to the service system 200 a maintenance request notification to request maintenance of the image forming apparatus 100 when the controller 110 judges that the image forming apparatus 100 needs maintenance.

In the configuration according to the embodiment, the controller 110 performs a significant difference test to check whether or not there is a significant difference between the target distribution data and the reference distribution data. Here, if the document conveying unit 1 has no fault (if the document conveying unit 1 conveys the document D normally), the document D being conveyed is unlikely to skew. However, if the document conveying unit 1 has a fault, the document D being conveyed is likely to skew. Thus, a significant difference arises between the target distribution data and the reference distribution data. Accordingly, the controller 110 performs a significant difference test to check whether or not there is a significant difference between the target distribution data and the reference distribution data, and based on the result of the test judges whether or not the image forming apparatus 100 needs maintenance. If the image forming apparatus 100 is judged to need maintenance, a maintenance request notification is transmitted to the service system 200. In this way, the user does not need to judge whether or not a fault in the document conveying unit 1 is causing the document D to skew; when the document conveying unit 1 has a fault, a maintenance request notification is transmitted automatically to the service system 200. On receiving the maintenance request notification, the service provider visits the site of the image forming apparatus 100 does maintenance on the image forming apparatus 100 (document conveying unit 1). It is thus possible to reduce the chance of the document conveying unit 1 with a fault will being left unattended to.

Here, if the document D skews irrespective of document D size, document D type, or reading mode, the document conveying unit 1 is highly likely to have a fault. That is, when the document conveying unit 1 is highly likely to have a fault, a large number of sets of target distribution data (for example, one-half or more) out the target distribution data generated for different document D sizes, different document D types, and different reading modes exhibit a significant difference. In contrast, when the document conveying unit 1 has no fault that may require maintenance, only a small number of sets of target distribution data exhibit a significant difference.

Accordingly, when the number of sets of target distribution data that exhibit a significant difference from the reference distribution data is equal to or larger than a threshold number, the controller 110 judges that the image forming apparatus 100 needs maintenance, and instructs the communicator 120 to transmit a maintenance request to the service system 200. That is, when the number of sets of target distribution data that exhibit a significant difference is smaller than the threshold number, no maintenance request is transmitted to the service system 200. It is thus possible to reduce the chance of a maintenance request notification being transmitted to the service system 200 when no maintenance is needed.

When the number of sheets in the documents D read during the predetermined period is equal to or smaller than a threshold number, the controller 110 performs no significant difference test. Here, if the number of sheets in the documents D read during the predetermined period is too small (if the number of sheets in the read documents D is equal to or smaller than the threshold number), significant difference tests cannot be performed with satisfactory reliability. Accordingly, the controller 110 performs significant difference tests only when the number of sheets in the documents D read during the predetermined period is large (when the number of sheets in the read documents D is larger than the threshold number).

Also if jams occur frequently in the document conveying unit 1 irrespective of document D size or document D type, the document conveying unit 1 is highly likely to have a fault. Accordingly, when all the numbers of jam occurrences found for different document D sizes and different document D types are equal to or lager than the threshold number, the controller 110 performs no significant difference test but instructs the communicator 120 to transmit a maintenance request to the service system 200.

It should be understood that the embodiments disclosed herein are in every aspect illustrative and not restrictive. The scope of the present invention is defined not by the description of the embodiment given above but by the appended claims, and encompasses any modifications made in the sense and scope equivalent to those of the claims.

For example, although, in the embodiment, target distribution data is generated for each group, it is also possible to generate target distribution data without classifying the skew angles stored in the storage 113 into groups. In other words, it is possible to generate, as target distribution data, only one set of distribution data that samples all angle data as to the skew angles corresponding to the documents D read during the predetermined period, and to perform a significant difference test only with that target distribution data.

In a case where the image forming apparatus 100 is furnished with a user authentication function (log-in function) for authenticating a user based on identification information read from an IC card (employee ID card) or based on a user ID, a password, or the like entered on the operation panel 8, it is possible to add, as property information added to angle data, user information indicating the user who was logged in when a corresponding D was read. In a case where user information is added to angle data, the skew angles stored in the storage 113 may be classified into groups on a user-by-user basis.

The invention claimed is:

1. An image forming apparatus comprising:
a document conveying unit which conveys a document;
an image reading section which reads the document being conveyed;
a storage which stores data;
a controller which
finds a skew angle indicating how each read document is skewed relative to a main scanning direction or a sub scanning direction,
stores angle data as to the skew angle in the storage,
generates distribution data indicating a distribution of the skew angle corresponding to documents read during a previously defined period,
performs a previously defined test to check whether or not there is a significant difference between the distribution data and reference distribution data previously stored in the storage, and
judges whether or not the image forming apparatus needs maintenance based on a result of the test;
a communicator which
is communicably connected to a service system of a service provider that provides maintenance services for the image forming apparatus, and
transmits to the service system a maintenance request notification to request maintenance of the image forming apparatus when the controller judges that the image forming apparatus needs maintenance; and
an acceptor which accepts a setting as to in which of reading modes to read a document out of
a normal reading mode for reading a document comprising a plurality of sheets of a same document size and
a mixed reading mode for reading a document comprising a plurality of sheets of varying document sizes,
wherein
a set of the distribution data is generated for each document size, each document type, and each reading mode, and
the controller
classifies the angle data as to the skew angle stored in the storage into groups according to a previously defined criterion,
generates a set of the distribution data for each group,
when a number of sets of the distribution data that exhibit a significant difference from the reference distribution data is equal to or larger than a threshold number,
judges that the image forming apparatus needs maintenance, and transmits the maintenance request notification to the service system, and
when the number of sets of target distribution data that exhibit a significant difference from the reference distribution data is smaller than the threshold number,
does not transmit the maintenance request to the service system.

2. The image forming apparatus according to claim 1, wherein
the controller
classifies the angle data as to the skew angle into groups according to document size and
generates a set of the distribution data for each document size.

3. The image forming apparatus according to claim 1, wherein
the controller
classifies the angle data as to the skew angle into groups according to document type and
generates a set of the distribution data for each document type.

4. The image forming apparatus according to claim 1, wherein
the controller
classifies the angle data as to the skew angle into groups according to reading mode and
generates a set of the distribution data for each reading mode.

5. The image forming apparatus according to claim 1, wherein
the controller does not perform the test when a number of sheets in documents read during the previously defined period is equal to or smaller than a previously defined threshold number.

6. The image forming apparatus according to claim 1, wherein
the controller
finds a number of jam occurrences in the document conveying unit during the previously defined period for each document size and each document type, and
when all numbers of jam occurrences found for different document sizes and different document types are equal to or larger than the threshold number,
does not perform the test but
instructs the communicator to transmit the maintenance request notification to the service system.

* * * * *